United States Patent
Barr et al.

(10) Patent No.: US 9,421,938 B2
(45) Date of Patent: Aug. 23, 2016

(54) VEHICLE INTERIOR PANEL WITH AIRBAG TEAR SEAM FORMED BY MECHANICAL PIERCING

(71) Applicant: Faurecia Interior Systems, Inc., Auburn Hills, MI (US)

(72) Inventors: Mathew Barr, Clarkston, MI (US); Aaron S. Wisniewski, Plymouth, MI (US); Brian Jacobs, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/646,310

(22) PCT Filed: Nov. 21, 2012

(86) PCT No.: PCT/US2012/066293
§ 371 (c)(1),
(2) Date: May 20, 2015

(87) PCT Pub. No.: WO2014/081426
PCT Pub. Date: May 30, 2014

(65) Prior Publication Data
US 2015/0298641 A1    Oct. 22, 2015

(51) Int. Cl.
*B60R 21/2165* (2011.01)
*B26F 1/24* (2006.01)
(Continued)

(52) U.S. Cl.
CPC ............ *B60R 21/2165* (2013.01); *B26D 3/08* (2013.01); *B26F 1/24* (2013.01); *B32B 37/18* (2013.01);
(Continued)

(58) Field of Classification Search
CPC ............... B60R 21/2165; B60R 21/21656; B60R 21/21658; B60R 2021/21652; B26F 1/14; B26F 1/24; B26F 2210/12; B32B 38/04; B32B 2038/042; B32B 2038/047; B32B 2605/003; B29C 2793/0045; B29L 2031/3038; B26D 3/08; B26D 3/085; Y10T 83/0333; Y10T 83/0341; Y10T 83/0356; Y10T 225/12
USPC .............. 280/728.3, 732, 731; 83/866, 880; 264/156; 225/2
See application file for complete search history.

(56) References Cited

U.S. PATENT DOCUMENTS

| | | | |
|---|---|---|---|
| 5,202,543 A | 4/1993 | Yoshimura | |
| 5,478,106 A * | 12/1995 | Bauer | B60R 21/2165 280/728.3 |
| 7,128,334 B2 * | 10/2006 | Leland | B29C 59/007 280/728.3 |

FOREIGN PATENT DOCUMENTS

| | | | |
|---|---|---|---|
| DE | 4135292 A1 | 5/1992 | |
| DE | 10042264 A1 * | 1/2002 | B23C 5/10 |
| DE | 102011004184 A1 | 8/2012 | |

(Continued)

OTHER PUBLICATIONS

International Search Report for application No. PCT/US2012/066293, dated Jun. 5, 2013, 4 pages.
(Continued)

*Primary Examiner* — Keith Frisby
(74) *Attorney, Agent, or Firm* — Reising Ethington P.C.

(57) ABSTRACT

A vehicle interior panel (10) includes a decorative covering (16) with a non-visible tear seam that forms a deployment opening through the covering during airbag deployment. The tear seam is formed by mechanical piercing of a skin layer (20) of the covering using a piercing tool (30) having a compound chamfer (40). Such piercing tools allow the mechanical piercing process to produce non-visible and functional tear seams in polymeric materials and non-polymeric materials such as leather, including materials with relatively low elastic recovery characteristics. Tear seams formed in this manner can offer larger processing windows, lower manufacturing and equipment cost, and/or shorter cycle times when compared to other methods such as laser scoring.

12 Claims, 3 Drawing Sheets

(51) Int. Cl.
  *B26D 3/08*      (2006.01)
  *B32B 37/18*     (2006.01)
  *B32B 38/04*     (2006.01)

(52) U.S. Cl.
  CPC ............ *B32B 37/182* (2013.01); *B32B 38/04* (2013.01); *B26F 2210/12* (2013.01); *B29C 2793/0045* (2013.01); *B32B 2038/047* (2013.01); *B32B 2605/003* (2013.01); *Y10T 83/0333* (2015.04)

(56) References Cited

FOREIGN PATENT DOCUMENTS

FR          2915156 A1      10/2008
WO    WO2006111212 A1      10/2006

OTHER PUBLICATIONS

Written Opinion for application No. PCT/US2012/066293, dated Jun. 5, 2013, 5 pages.

\* cited by examiner

VEHICLE INTERIOR PANEL WITH AIRBAG TEAR SEAM FORMED BY MECHANICAL PIERCING

TECHNICAL FIELD

The present disclosure relates generally to vehicle interior panels and coverings having tear seams for use over airbags.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to at least partly define the location of the opening.

German patent DE 4411283 to Stückle et al. describes one method of forming a tear seam that includes stitching an outer foil to hold the outer foil in place over the airbag. The needle used to apply the stitching perforates the outer foil along a groove or ditch in the outer foil to form a visible, stitched tear line. The foil is heated along the stitched tear line to shrink the perforations, and then cooled rapidly.

SUMMARY

In accordance with one embodiment, a method of making a vehicle interior panel having a non-visible airbag tear seam includes the steps of: (a) providing a decorative covering having a decorative skin layer; (b) disposing the covering over a substrate, the substrate having a pre-determined location for an airbag deployment opening; and (c) forming a plurality of microholes through the skin layer using a mechanical piercing tool at a plurality of spaced apart locations corresponding to the deployment opening location. The piercing tool includes a compound chamfer at a piercing end of the tool and the tear seam comprises at least some of the formed microholes.

In another embodiment, the method includes piercing the skin layer from a decorative side of the covering.

In another embodiment, the skin layer comprises leather.

In another embodiment, the skin layer comprises a polymeric material.

In another embodiment, the compound chamfer includes a chamfer surface that forms an angle of 10 degrees or less with a longitudinal axis of the piercing tool.

In another embodiment, the compound chamfer includes a pair of chamfer surfaces that are symmetric with respect to a longitudinal axis of the piercing tool.

In another embodiment, wherein the chamfer surfaces of said pair of chamfer surfaces intersect along an edge of the piercing tool, and the edge extends from a tip of the piercing tool to another chamfer surface.

In another embodiment, the piercing tool has an effective piercing diameter in a range from 0.1 mm to 0.75 mm In another embodiment, the effective piercing diameter is 0.4 mm or less.

In another embodiment, the piercing tool includes a generally cylindrical shank that passes at least partly through the skin layer during the method, and the formed microholes have an aspect ratio of 2.0 or higher.

In another embodiment, the piercing tool is configured to form microholes that are laterally offset from the center of a cylindrical shank of the piercing tool.

In another embodiment, the covering is disposed over the substrate before the microholes are formed.

In accordance with another embodiment, a vehicle interior panel for use over an airbag includes: a substrate having a pre-determined location for an airbag deployment opening, and a decorative covering disposed over the substrate. The decorative covering includes a decorative skin layer, and a non-visible tear seam is formed in the decorative covering over the airbag deployment opening location. The tear seam includes a plurality of elongated holes formed through the skin layer. At least some of the elongated holes are curved in the elongate direction and have an aspect ratio of 2.0 or higher.

In another embodiment, the skin layer comprises leather or a polymeric material that is at least partially cross-linked.

In another embodiment, at least some of the holes are partially bound by a curved edge having a central angle of 180 degrees or less.

Within the scope of this application it is envisaged that the various aspects, embodiments, examples, features and alternatives set forth in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

As will be apparent from the following disclosure, non-visible tear seams may be formed in airbag coverings by a mechanical piercing method. In certain applications, tear seams formed in this manner can offer larger processing windows, lower manufacturing and equipment cost, and/or shorter cycle times when compared to other methods such as laser scoring. A piercing tool having a compound chamfer may be used to form holes through a skin layer of the decorative covering. The compound chamfer can be configured to control the shape of the formed holes to lessen the visibility of the holes and/or enhance tear seam function. The compound chamfer can also be configured to form non-visible holes in all types of skin layer materials, even materials having relative low elastic recovery characteristics. Piercing tools having relatively small cross-sections may be employed as well. It is noted that the appended drawings are not necessarily to scale and that any cross-hatching shown is provided for clarity in distinguishing among different components and is not meant to limit the types of materials that may be used for each component.

Figure 1:
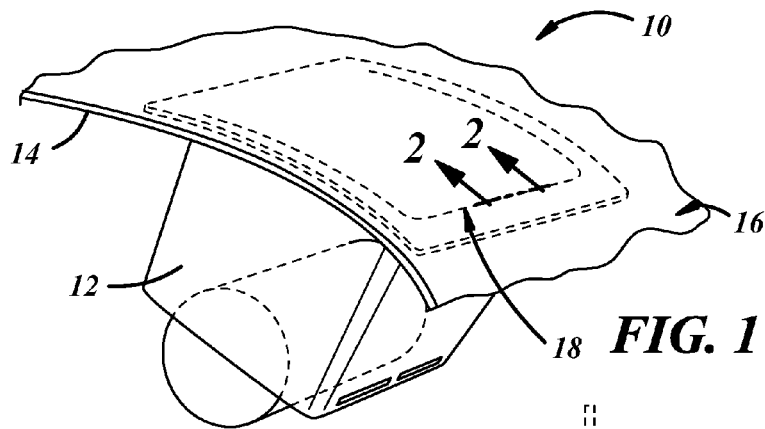
FIG. 1 is a cutaway view of an instrument panel with a non-visible tear seam arranged over an airbag module.

Referring now to FIG. 1, a cut-away view of an illustrative vehicle interior panel 10 is shown with an airbag module 12 installed therebeneath. Panel 10 includes one or more layers of materials, and each layer may include its own separately weakened portion or tear seam for the formation of airbag deployment openings in each layer that can together form a deployment opening through the overall panel. The portion of panel 10 shown in the figure is the passenger side of an instrument panel and includes a substrate 14, a covering 16, and a tear seam 18. The tear seam 18 is a non-visible tear seam in this example. The particular tear seam 18 shown is generally U-shaped, but may assume other shapes, such as a rectangle, H-shape, or X-shape, to list a few examples. A vehicle passenger side airbag is used only as an example of one type of airbag that may benefit from the following disclosure, and any type of panel for use over a vehicle airbag can be made or used in accordance with these teachings.

The tear seam 18 generally includes a weakened portion of the panel 10 and/or its individual layers. The weakened portion is often arranged along a line or path that at least partly defines the location of the airbag deployment opening. For example, in the panel 10 of FIG. 1, the U-shaped tear seam 18 corresponds to three sides of a rectangular deployment opening that is formed through the panel 10 when the force of the airbag breaches one or more panel layers during deployment. The opening is formed at the tear seam 18 because of the local weakening. As used herein, "weakening" is a term of art that also refers to stress-concentration. That is to say that the panel materials along the tear seam 18 are not necessarily of lower strength than in other areas of the panel—rather that tear seams are sometimes formed by localized thickness reduction in panel materials, which effectively concentrates stress at the reduced thickness portion when airbag forces are applied. Airbag deployment openings may also be determined in part by a pre-formed opening in the substrate 14.

Figure 2:
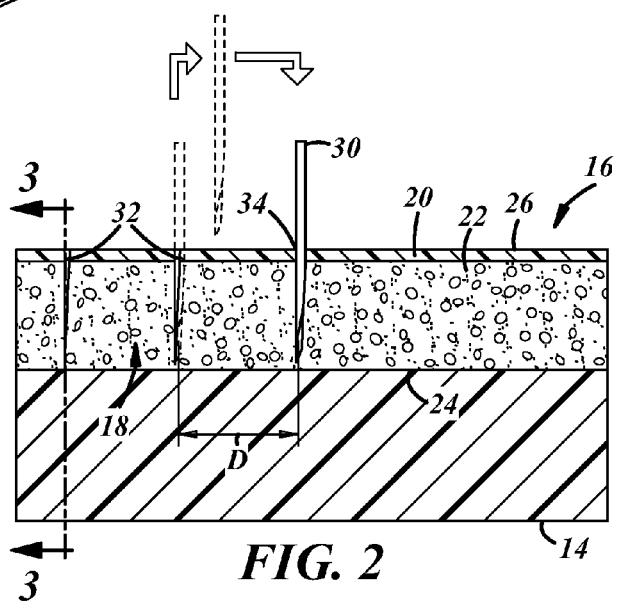
FIG. 2 is a cross-sectional view of a vehicle interior panel, showing a tear seam being formed by a mechanical piercing process from the decorative side of a covering, according to one embodiment.
Figure 3:
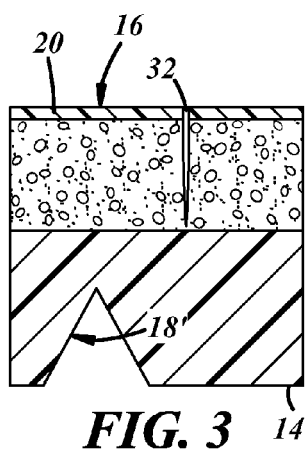
FIG. 3 is a cross-sectional view of the vehicle interior panel of FIG. 2, additionally showing a tear seam formed in the substrate.

FIG. 2 is a cross-section of a vehicle interior panel taken along a tear seam that is shown during a mechanical piercing process, according to one embodiment. The covering 16 overlies the substrate 14 to at least partly form the panel 10, though the panel may include other components not shown. The covering 16 may be disposed over the substrate either before or after the piercing process is performed, or piercing processes may be performed both before and after the covering is disposed over the substrate. The substrate 14 may provide the basic shape and/or support structure for the panel 10 and can be constructed from nearly any material or combination of materials, including metals, plastics, or composite type materials such as reinforced or filled thermoplastic materials. Polypropylene or other olefin-based plastics having 15-30% glass fiber reinforcement are examples of suitable substrate materials. The substrate 14 may have an airbag deployment opening formed therethrough, an airbag door at least partly defined by a slot formed through and along the substrate in the desired shape, or a weakened portion that acts as a tear seam to form the deployment opening. FIG. 3 shows one example of the panel 10 where the substrate 14 includes its own tear seam 18' in the form of a notch-like groove. Such a groove may be molded-in, milled, knife cut, laser cut, or otherwise formed in the substrate, and may be continuous or discontinuous. For example, laser scoring may be used to form a tear seam in the substrate, where the tear seam comprises a plurality of laser cuts or holes at least partially through the substrate.

The covering 16 may provide a desired aesthetic for the vehicle interior and includes one or more layers of materials. In the embodiment of FIG. 2, the covering 16 has a bilayer construction and includes a skin layer 20 overlying an inner layer 22. The skin layer 20 can provide the panel 10 with the desired appearance and tactile feel, and the inner layer 22 can enhance the tactile feel of the panel by providing a cushion-like effect. The skin layer 20 may be constructed from any of a variety of materials, some of which will be described below in conjunction with the description of the tear seam forming process. Layer 20 may range in thickness from about 0.3 mm to about 1.5 mm. Inner layer 22 may be a polymeric foam material such as polypropylene foam or other olefin-based foam. The thickness of the inner layer 22 can range anywhere from 0.5 mm to 5.0 mm depending on the desired amount of cushioning or other factors. Inner layer 22 can also be made from other types of foam materials, felt, batting, spacer fabric, or natural or synthetic textile materials, for example. Layers 20 and 22 can serve other functions as well, and additional layers of material may be included in the covering 16, such as additional padding, foam, adhesive, or surface finish layers. In one embodiment, the skin layer 20 alone is the covering. The covering 16 includes opposite inner and outer surfaces 24 and 26 and may be attached to the underlying substrate by any suitable method, such as adhesive attachment, lamination, or wrapping the covering around substrate edges for attachment to an underside of the substrate. In some embodiments, the inner layer 22 may be up to 5 mm, up to 10 mm, or up to 25 mm thick. For instance, the panel 10 may include a slush molded skin layer 20 with a foam inner layer 22 that is formed in place by filling a space between the skin layer and substrate with an expandable foam composition.

Conventionally, when it is desired to make a tear seam non-visible, the tear seam is formed in and from the non-visible side of the covering—i.e., the side facing the substrate—and any cutting or material removal performed during tear seam formation does not extend completely through the skin layer. But relatively thin polymeric skin layers leave little room for process variation when it is desired to control the residual wall thickness during laser or other types of scoring techniques. In addition, lower density foam layers can be burned away or locally lose their cellular structure more than is necessary or desirable in tear seam forming processes where heat, laser light, or other thermal energy is part of the process. Certain non-polymer materials such as leather may also be desirable for use in the skin layer for the luxurious look and feel they can provide. Such materials may be stronger than polymeric materials and thus more difficult to sufficiently weaken to form a properly functioning tear seam. Skin layers made with non-synthetic materials also tend to have more variation in material properties throughout the layer. Some techniques have been devised to hide or mask tear seams with other visual elements at the decorative side of the covering. But such techniques, such as including sewn stitches through the covering along the tear seam and/or forming a visual groove in the outer surface of the covering along the tear seam are, by their very nature, visible indicators of a tear seam. Such tear seams are not considered non-visible for purposes of this disclosure.

Referring again to FIG. 2, a non-visible tear seam 18 can be formed in panel 10 by forming a plurality of holes 32 through the skin layer using a mechanical piercing tool 30. The holes 32 are formed through the skin layer along a line or path that corresponds to the pre-determined location of the airbag deployment opening. In the illustrated embodiment, the piercing tool 30 is a needle or needle-like tool that pierces the skin layer 20 from the decorative side of the covering 16 by moving in a direction toward the outer surface 26 of the covering until it passes through the skin layer 20. The piercing tool 30 may continue in the same direction through the skin layer 20 and at least partially into the inner layer 22 as shown, but this is not always necessary. In some embodiments the piercing tool 30 may continue in the same direction until it reaches or passes through the inner surface 24 of the covering, which is the inner surface of the inner layer 22 in FIG. 2. When the piercing is performed after the covering 16 is already disposed over and/or attached to the substrate 14, the substrate may act as a positive stop for the piercing tool. After reaching the desired depth, the tool 30 may be withdrawn from the covering 16 in the opposite direction and can index to the next piercing location along the covering to pierce the skin layer 20 again. An effective piercing diameter 34 is defined by the effective diameter of the piercing tool at the outer surface 26 of the covering 16 when the piercing tool is at its maximum depth.

In one embodiment, the process is similar to a sewing process without thread, where the covering 16 is advanced beneath an oscillating needle to form the tear seam. In other embodiments, a robot or other numerically controlled equipment may be used to allow for more process customization (e.g., variable hole spacing, variable piercing tool depth into the thickness of the covering, hole orientation, etc.). In some cases, it may be preferred that the needle or tool 30 is oriented perpendicular to the outer surface 26, that the tool passes through the skin layer 20 in a direction generally normal to the outer surface, and that the tool is completely withdrawn from the covering 16 by moving in the opposite direction before being indexed to the next piercing location. Ensuring that the tool 30 is completely withdrawn from the covering 16 before moving the tool to the next piercing location can help to minimize unwanted enlargement of the just-formed hole. The skin layer 20 may also be mechanically pierced from the opposite side of the covering 16 (i.e., entering the covering through the inner surface 24) when the process is performed prior to disposing the covering over the substrate 14.

While piercing the skin layer 20 may be an unconventional method of forming a non-visible tear seam (i.e., the piercing results in a series of holes in the visible outer surface of the covering), certain process and material parameters may be controlled to make the resulting tear seam 18 a non-visible tear seam. For example, the size of the holes 32 and/or the spacing between adjacent holes may have an effect on the visibility of the finished tear seam 18. In one embodiment, the holes 32 through the skin layer are in the form of microholes. A microhole is a hole with an effective diameter or other characteristic that renders the hole small enough to be visually undetectable at a typical vehicle interior viewing distance. Some of the characteristics than can affect the visibility of a pierced hole are the effective diameter of the hole, the largest width of the hole, the shape of the hole, the aspect ratio of the hole, and the projected area of the hole, to name a few. Some of these are discussed in further detail below. Other factors may include the color of the skin layer, the roughness of the outer surface 26, the depth of any decorative grain or texture at the outer surface, the overall tear seam shape, or other factors. As used herein, the effective diameter of any shape can be found by setting the area of the shape equal to the equation for the area of a circle and solving for the diameter.

Another factor that may affect overall tear seam visibility is the spacing D between adjacent holes. For example, there may be a threshold value for D below which the tear seam becomes visually perceptible even if the individual microholes are not. Holes spaced too closely may result in stress concentration in the skin material between adjacent holes that is high enough to cause visual distortion in the skin layer, which may show as a faint witness line along the tear seam. This is the same type of stress concentration that promotes proper tear seam function. Thus, a smaller hole spacing D promotes better tear seam function, and a larger hole spacing D promotes tear seam non-visibility. It has been found that a hole spacing D of about 10 mm or more is sufficient between adjacent microholes 32 to form a non-visible tear seam. The hole spacing D can be as low as 0.5 mm between adjacent microholes and result in a non-visible tear seam. In some cases, the hole spacing D may be even lower, such as between 0.2 mm and 0.5 mm, particularly with higher strength materials such as leather. This is lower than the hole spacing typically used with laser scoring, particularly with coverings having foam inner layers. This may be partly because the mechanical piercing described herein does not remove any substantial amount of material from the covering 16. Smaller values for D are possible, and values of 3.0 mm or more have also been found to allow proper tear seam function. As with hole size, the threshold values for D will vary depending on other factors such as the type of materials used in the individual covering layers.

The hole spacing D and/or the hole size, shape, and/or orientation may be varied from hole to hole. For example, one portion of the tear seam may include hole spacing D that is lower than the hole spacing at a different portion of the tear seam. This can effectively control the stress distribution along the tear seam during airbag deployment. For instance, where it is desired to cause the covering to tear in a particular direction along the tear seam during airbag deployment, the hole spacing can be varied from lower values to higher values in the desired direction. Likewise, hole size can be varied from lower values to higher values in the desired tearing direction, as long as both the hole size and spacing are together sufficient to make the tear seam non-visible. The holes may also be shaped with stress directors, such as sharp corners along the perimeter of the individual holes, so that the holes can be oriented with the stress directors aligned in the desired tearing direction.

Tear seam visibility may also be affected by the presence or absence of a grain pattern or other texture formed in the outer surface 26 of the skin layer 20. Such patterns or textures are sometimes formed in polymeric skin layers to simulate leather, to impart leather materials with a certain aesthetic, or otherwise enhance the panel appearance and can be formed during skin layer manufacturing by calendaring, or can be formed by in-mold graining techniques, for example. The somewhat random pattern that is typical with vehicle interior grain patterns can have the effect of making pierced holes less visible in the skin layer. This camouflaging effect of a grain pattern or texture may be due to light reflection by the texture in multiple random directions, shadows from the three-dimensional features in the texture, location of some of the holes in grooves of the texture, or other types of visual blending. While such a texture is not necessarily able to change large visible holes to non-visible holes, it may promote use of larger microholes, which can improve tear seam function and broaden the piercing process window. The average grain or texture peak-to-valley depth may range anywhere from about 75 μm to about 175 μm with polymeric skin layers. Some less pronounced textures, such as a stipple finish, may have a lower peak to valley depth.

Figure 4:
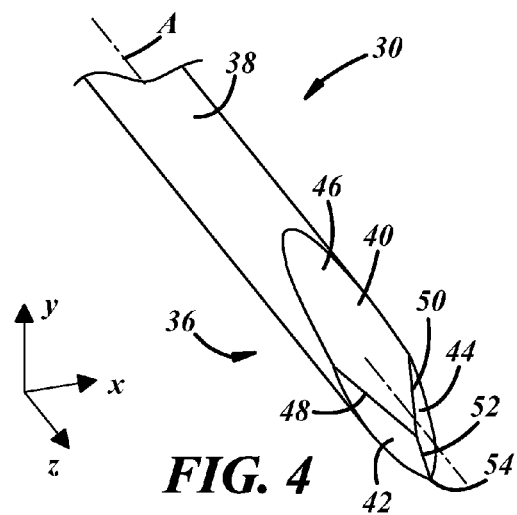
FIG. 4 is a perspective view of an illustrative piercing tool with a compound chamfer.

Referring now to FIG. 4, there is shown a portion of an illustrative piercing tool 30 that may be used in the method outlined herein. The illustrated piercing tool 30 includes a piercing end 36 and a shank 38 that extends along a longitudinal axis A between the piercing end and an opposite fixture end (not shown). The piercing tool 30 may be held in place at the fixture end by attachment, clamping, or other means by which the tool can be located, moved, oriented, and/or manipulated. The illustrated piercing end 36 includes a compound chamfer 40 with a plurality of chamfer surfaces 42-46, described in more detail below. As used herein, a compound chamfer includes at least one pair of chamfer surfaces arranged so that the surfaces are not symmetric with each other with respect to the longitudinal axis A. Also, a chamfer surface is a generally flat or planar surface that forms an angle between 0° and 90° with the longitudinal axis A. A compound chamfer may also be characterized by chamfer surfaces that intersect each other along an edge that is not perpendicular to the longitudinal axis A and/or does not intersect the longitudinal axis A. A compound chamfer may also include a chamfer surface that is longer in the longitudinal direction (the z-direction of FIG. 4) than another chamfer surface, or a chamfer surface that is different in size and/or shape than another chamfer surface.

With continued reference to FIG. 4, the illustrated compound chamfer 40 includes examples of all of these characteristics, with a symmetric pair of side chamfer surfaces 42, 44 and a third, larger chamfer surface 46 centered therebetween. Chamfer surface 46 intersects both of the side chamfer surfaces 42, 44 at respective edges 48, 50. Chamfer surface 46 is not symmetric with either of the side chamfer surfaces 42, 44, particularly with respect to any plane arranged along the longitudinal axis A. A third edge 52 is located at the intersection of the side chamfer surfaces 42, 44 and extends between a tip 54 of the piercing tool 30 and the third chamfer surface 46. None of the illustrated edges 48-52 are perpendicular with the longitudinal axis A. Additionally, the chamfer surface 46 is longer in the z-direction than the side chamfer surfaces 42, 44. Chamfer surface 46 is also different in both shape and size from the side chamfer surfaces 42, 44. As described below, this and other compound chamfers may offer certain advantages over simpler single chamfers and/or symmetric chamfers in the mechanical piercing process.

Figure 5:
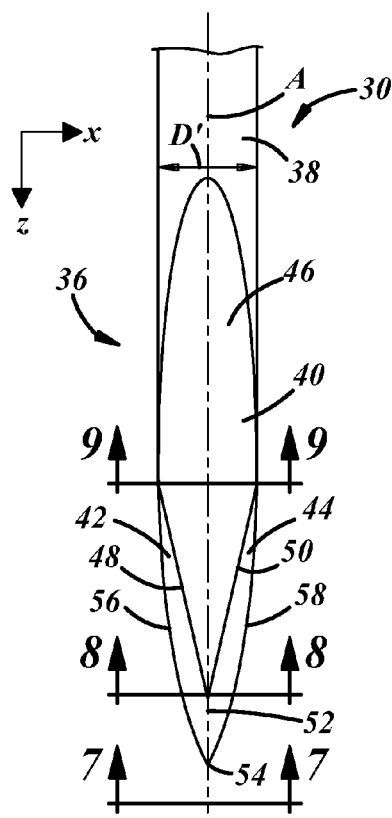
FIG. 5 is a front view of the piercing tool of FIG. 4.
Figure 6:
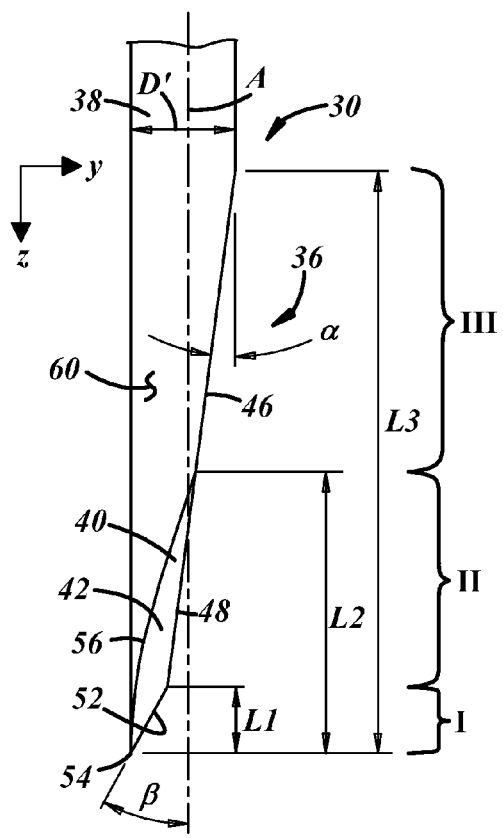
FIG. 6 is a side view of the piercing tool of FIG. 5.

FIG. 5 is a front view of the piercing tool 30 of FIG. 4 with the longitudinal axis A oriented vertically, and FIG. 6 is a side view of the same piercing tool. FIGS. 5 and 6 together show the chamfer surfaces 42-46, edges 48-52 and tip 54. Edges 56, 58 are also shown and are located where respective side chamfer surfaces 42, 44 intersect the partial cylindrical surface 60 of the piercing end of the tool 30 that extends between the shank 38 and the tip 54. Surface 60 is an extension of the outer surface of the shank 38, which is cylindrical in this case with an effective diameter D'. Where cylindrical, the effective diameter D' is the actual diameter, but other non-cylindrical shapes are possible as well. The effective diameter for a non-circular cross-section is determined by setting the cross-sectional area equal to the equation for the area of a circle and back-calculating the effective diameter. Depending on the type of skin layer materials used, the geometry of the compound chamfer, and/or other factors, the effective diameter D' (which may also be the effective piercing diameter 34 from FIG. 2) may be in a range from 0.1 to 0.75 mm to form microholes as part of a non-visible tear seam. More specific examples are given below.

FIG. 6 illustrates certain dimensions of the compound chamfer 40. For example, chamfer surface 46 forms an angle α with the longitudinal axis A, and edge 52 forms an angle β with the longitudinal axis A. As discussed further below, these angles may be tailored to help control microhole formation and the final shape of the microholes. Angle α may be in a range from 1 to 10 degrees, and is preferably less than the angle β. Angle α is preferably in a range from 5 to 8 degrees, and in one particular embodiment is about 7 degrees. Angle β is preferably greater than angle α and may be in a range from 5 to 45 degrees. Angle β is preferably in a range from 20 to 35 degrees, and in one particular embodiment is about 27 degrees. Also shown in FIG. 6 are lengths L1-L3. L1 is the longitudinal distance from the tip 54 to chamfer surface 46, or the length of the edge 52 in the z-direction. L2 is the longitudinal length of the side chamfer surfaces 42, 44. L3 is the longitudinal distance from the tip 54 to the opposite end of the chamfer surface 46, or the overall length of the compound chamfer 40. One or more of these dimensions L1-L3 may be a function of the selected angles α and β. In one example, the effective diameter D' of the shank 38 is between 0.4 and 0.5 mm, and L1 is between 1.5 mm and 2.5 mm. In another example, the effective diameter D' is between 0.15 and 0.25, and L1 is between 0.5 mm and 1.5 mm. In another embodiment, L1 is less than the thickness of the covering 16. L2 is between L1 and L3, and the ratio L2/L1 may range from 0.25 to 0.75. In one embodiment, L2/L1 is in a range from 0.4 to 0.6. In one particular embodiment, L2/L1 is about 0.5.

The piercing end of the tool 30 can generally be divided into three longitudinal regions I-III. Region I is at one end of the compound chamfer 40 and includes the tip 54 and edge 52. In this particular example, the chamfer surface 46 does not extend into region I. Region II includes portions of all three chamfer surfaces 42-46 and extends between regions I and III. Region III is at the opposite end of the compound chamfer 40 from the tip 54. In this example, the chamfer surfaces 42, 44 do not extend into region III. Other compound chamfers may include more or less longitudinal regions with more or less chamfer surfaces in each region, and regions I-III are shown here for subsequent reference.

Figure 7:
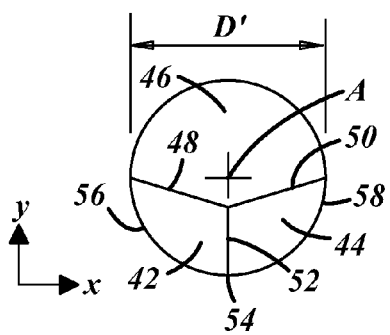
FIG. 7 is an enlarged end view of the piercing tool of FIG. 5.
Figure 8:
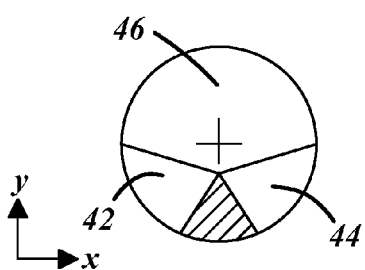
FIG. 8 is a cross-sectional view of the piercing tool of FIG. 5.
Figure 9:
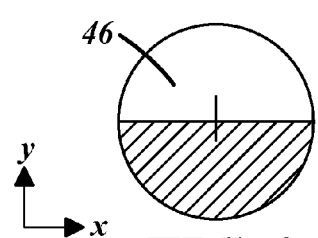
FIG. 9 is another cross-sectional view of the piercing tool of FIG. 5.
Figure 10:
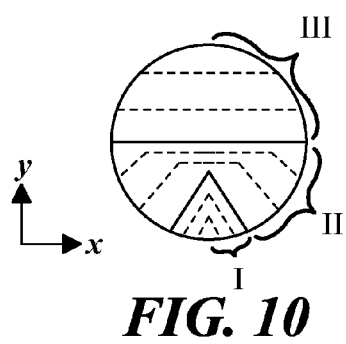
FIG. 10 is a composite view of various cross-sectional shapes along the piercing tool of FIG. 5.

FIG. 7 is an end view of the piercing tool 30 of FIGS. 4-6, showing the tip 54 and some of the various surfaces and edges. FIG. 8 is a cross-sectional view of the piercing tool of FIGS. 4-6 taken at the boundary between regions I and II. The cross-section in region I is wedge-shaped that is larger with increasing distance from the tip 54. FIG. 9 is a cross-sectional view of the same piercing tool taken at the boundary between regions II and III. The cross-section in region II transitions from the wedge shape of region I to the partial circle shape of region III. FIG. 10 is a composite view of the cross-sectional shape of the compound chamfer 40 taken at multiple points therealong. The cross-sectional shape of the compound chamfer 40 starts as a point at the tip 54 and grows from a small wedge to a larger wedge in region I. In region II, the cross-sectional shape has four sides: an arc (the bottom of the circular shape in FIG. 10), an opposite straight edge (the horizontal top of the shape in region II of FIG. 10), and symmetric edges connecting the ends of the arc with the ends of the opposite straight edge. In region III, the cross-sectional shape is a truncated circle shape.

As shown in the composite view of FIG. 10, the magnitudes of the directional dimensional changes vary from region to region along the length of the piercing end of the tool. For example, the y-dimension of the tool may change by approximately the same amount as the arc length of the wedge within region I. In region II, however, the y-dimension of the tool changes a relatively small amount compared to the arc length of the cross-sectional shape. In region III, the y-dimension changes less than the arc length of the cross-sectional shape, but the difference is not as great as in region II. It is believed that the result of this type of compound chamfer profile is the application of variable strain and/or strain rates to the skin layer material along the piercing tool surface as the piercing tool passes through the skin layer. For example, as region II of the piercing end of the tool passes through the skin layer, skin layer material along edges 56, 58 of the compound chamfer is subjected to a higher strain and/or strain rate than material along chamfer surface 46.

Figure 11:
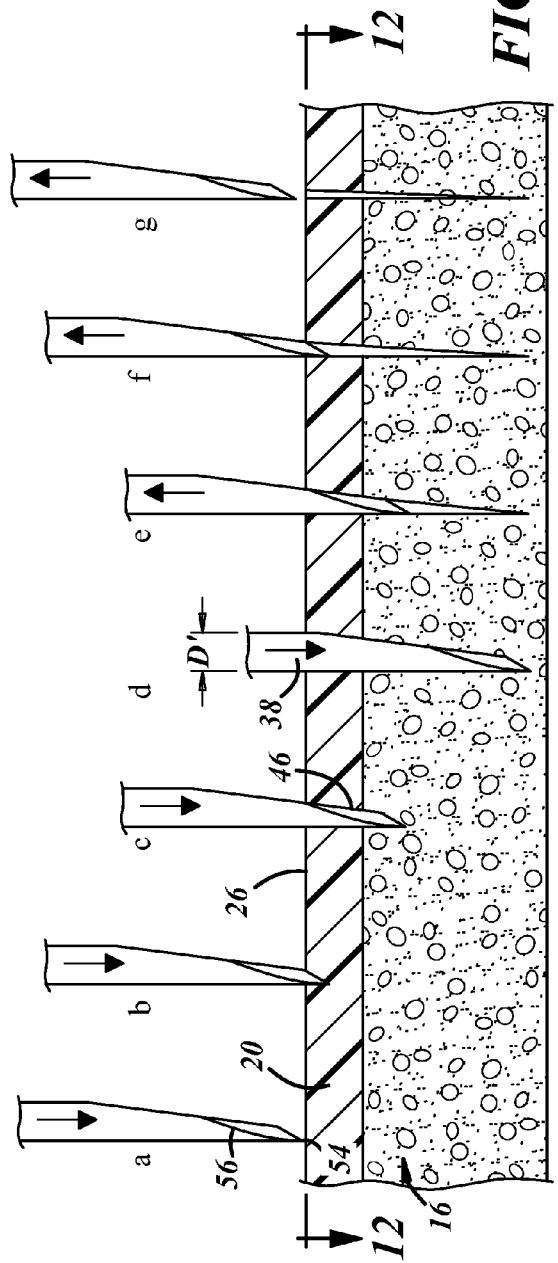
FIG. 11 is side view of the piercing tool of FIG. 5 shown in sequential positions a-g relative to the decorative covering during a mechanical piercing process.
Figure 12:
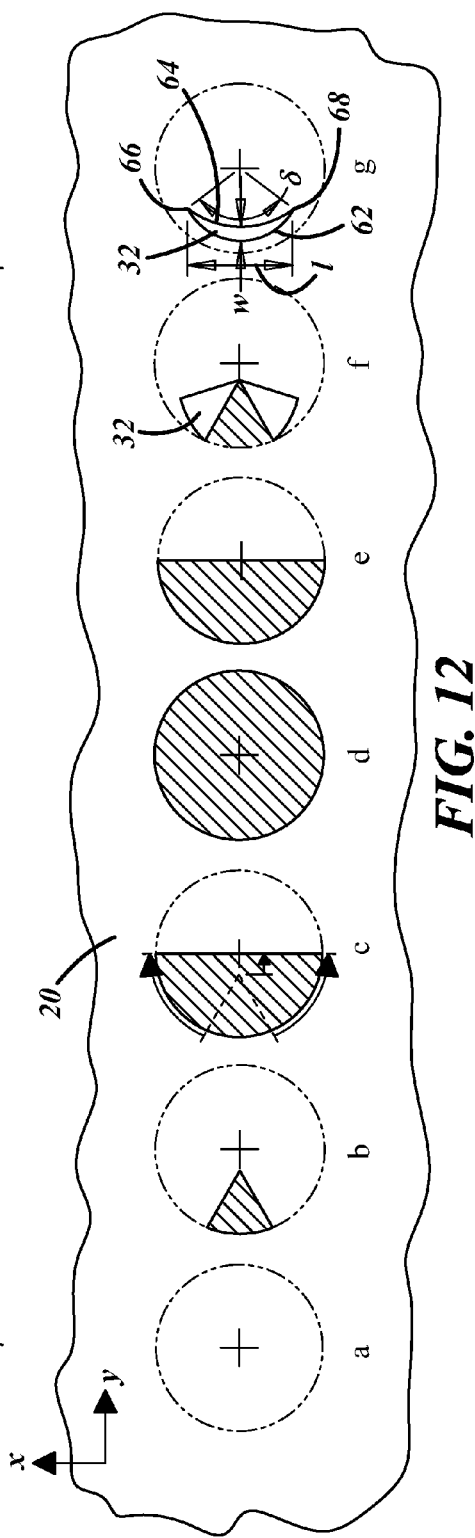
FIG. 12 is a cross-sectional view of FIG. 11.

This phenomenon is shown more explicitly in FIGS. 11 and 12. FIG. 11 shows the piercing tool 30 in sequential positions a-g relative to the covering 16 during the piercing process, and FIG. 12 shows the corresponding cross-sections, with the piercing diameter of the tool shown in phantom. Region I of the tool 30 passes at least partially through the skin layer 20 from position a to position b. Region II of the tool passes through the outer surface 26 of the skin layer from position b to position c, and in this example, where L2 (see FIG. 6) is greater than the thickness of the skin layer 20, the skin layer is pierced before region III of the tool begins to pass through the skin layer and before region II passes all the way through the thickness of the skin layer. At position d, the piercing diameter is reached, which in this case is the effective diameter D' of the shank 38. At position e, the tool 30 is partially withdrawn from the covering 16 and the skin layer material at least partially recovers elastically around the tool, in this example. At position f, the tool 30, specifically region II, is further withdrawn from the covering, and the hole 32 is apparent in the skin layer, though not necessarily in its final shape. At position g, the tool 30 is completely withdrawn from the skin layer, and the skin layer material may elastically recover, to the extent possible, bringing hole 32 to its final shape. The final shape is a crescent or crescent-like shape, which may also be described as an elongated hole or slot in a curved shape. The depiction in FIGS. 11 and 12 is only schematic, as other factors, such as any deflection of the skin layer as the piercing tool presses against the outer surface 26, are not taken into account.

While not being bound by theory, it is believed that as region II of the illustrated piercing tool passes through the skin layer, the material of the skin layer is preferentially cut along edges 56, 58 of the tool due to the higher localized strain rate at those edges than at anywhere else along the perimeter of the tool in region II. The amount of material movement at edges 56, 58 along the perimeter of the tool compared to the amount of material movement along chamfer surface 46 is depicted by arrows in FIG. 12 at position c. Some of the unusual results of the compound chamfer include the ability to form a hole having a high aspect ratio using a tool with low aspect ratio, the ability to form a hole having a different shape from the tool shank, the ability to use a piercing tool with an unusually low effective diameter, and the ability to form non-visible microholes in skin layer materials with relatively low elastic recovery characteristics. For example, even with a cylindrical shank (aspect ratio=1) that penetrates the skin layer during the piercing process, a hole may be formed that has an aspect ratio of 2.0 or higher. Other examples are given below.

Referring to FIG. 12, the illustrative hole 32 formed and shown at position g is generally crescent-shaped. However, it should be understood that not all microholes formed with compound-chamfered piercing tools are crescent-shaped and that the crescent-shape is not necessarily a perfect crescent bound by arcs of eccentric circles. Hole 32 may be treated as an elongated slot shape that is curved along its elongate direction. The slot shape is laterally offset from the location along the covering through which the longitudinal axis of the piercing tool passed, as shown. Hole 32 is bound on two sides by outer and inner edges 62, 64, the outer edge being the edge that is furthest from the center of curvature of the outer edge. In this case, the outer edge 62 is arc-shaped, and the center of curvature may correspond to the longitudinal axis A of the piercing tool that formed the hole. The outer edge 62 has an associated central angle $\delta$ as well. The elongated hole 32 has a maximum width, near the center of the crescent in this case, and a length l that together define an aspect ratio l/w. At least some of these hole characteristics have an effect on whether or not the hole 32 is a microhole (not visible).

With certain skin layer materials, an elongated hole with a length that is 0.15 mm or less and greater than zero and/or a width that is less than 0.025 mm and greater than zero is a microhole. Larger dimensions are possible, though, depending on other factors such as the hole shape, skin layer surface texture, etc. The approximate cross-sectional area of the hole 32 is the length multiplied by the width (l×w), and an area that is greater than zero and less than 4200 $\mu m^2$ has also been determined to be a microhole. This is equivalent to an effective hole diameter that is greater than zero an less than 75 $\mu m$. Holes having an aspect ratio that is greater than 6 have also been determined to be microholes in some cases. In one embodiment, a microhole has a central angle $\delta$ that is less than 180°. The central angle $\delta$ is preferably less than 120° and/or in a range from 45° to 120°. The central angle $\delta$ in this particular example is a measurement of the arc between the opposite endpoints 66, 68 of the elongated slot. These endpoints 66, 68 are also examples of stress directors, and the hole 32 may be formed with a particular orientation to direct stresses along the desired direction of tearing of the tear seam.

Piercing tools having relatively small effective diameters are at least partly enabled by the use of a compound chamfer. For example, experiments have been conducted with piercing tools having effective shank diameters of about 0.21 mm and about 0.44 mm. In both cases, non-visible and functional tear seams were successfully produced by mechanical piercing where the skin layer material is a TPO material. In fact, the microholes formed in this case had dimensions too small to be visible under magnification by a conventional microscope, but the tear seam functioned properly to allow airbag deployment. The 0.21 mm diameter piercing tool produced non-visible and functional tear seams in materials having relatively low elastic recovery characteristics, such as leather and TPO material that is at least partially cross-linked. Such small effective diameter tools were previously thought too small to use in a piercing process due to their tendency to buckle or bend under the applied piercing load. The compound chamfer can reduce or eliminate such problems at least partly because multiple longitudinal regions (e.g., regions I-III in previously described example) can be created, each with different functions and/or characteristics.

For example, a tip region (e.g. region I) can be configured with sharp point and/or with edges and surfaces that strain the skin layer material relatively uniformly to initially break through the material. A secondary region (e.g. region II) can be configured to preferentially strain the skin layer material as the tool passes through it to help determine the direction in which the material is cut or sheared. Additional regions (e.g. region III) may be configured to selectively enlarge the hole along the directions determined by the secondary region. Any one of these regions alone may be insufficient to form microholes for a functional tear seam. For example, a shallow-angle chamfer alone (e.g. chamfer surface 46 of FIG. 4) could provide preferential strain distribution, but it could also make the overall length of the tool longer and thus more susceptible to bending, and the preferential strain distribution may not be useful or helpful until the skin is initially pierced. Or a sharp, conical tip alone could be useful to break through the skin layer but cannot be used to concentrate strain along any one portion of the tool perimeter.

Other variations of the above-described method include the use of a piercing tool with a compound chamfer having only two chamfer surfaces or more than three chamfer surfaces. In other embodiments, more than one microhole is formed at the same time and/or in the same piercing cycle by employing a plurality of piercing tools that extend from a common tool block. Where a plurality of piercing tools is used, not all of the piercing tools have to be arranged to contact the skin layer 20 at the same time. The individual piercing tools may extend from a fixture by different amounts so that they contact the skin layer at different times during fixture movement toward the covering, thus avoiding the application of excessive piercing forces. A plurality of piercing tools could also extend radially from a rotary tool block that rolls along a surface of the covering and pierces the skin layer along the way. These and other embodiments of the mechanical piercing process may of course include additional steps, or one or more steps could be omitted in certain cases. For example, the skin layer could be heated after piercing to further reduce the size of the microholes if desired, even though it is unnecessary with proper piercing tool configuration as described above.

The method may be used to form non-visible airbag tear seams in vehicle seating assemblies as well. For example, the above described panel may be part of a seating assembly. In this case, the substrate may be a foam cushion with a pre-determined deployment opening location. The covering may include a leather skin layer, alone or with one or more additional layers. The tear seam may be formed as a plurality of holes pierced through the skin layer of the seat assembly by the above-described method. This technique could eliminate the need for visible faux seams that are sometimes included in seat assemblies to facilitate airbag deployment from an airbag module housing within the seat assembly.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel having a non-visible airbag tear seam, comprising the steps of:
    (a) providing a decorative covering having a decorative skin layer;
    (b) disposing the covering over a substrate, the substrate having a pre-determined location for an airbag deployment opening; and
    (c) forming a plurality of microholes through the skin layer using a mechanical piercing tool at a plurality of spaced apart locations corresponding to the deployment opening location, wherein the piercing tool includes a compound chamfer at a piercing end of the tool and the tear seam comprises at least some of the formed microholes.

2. The method of claim 1, wherein step (c) includes piercing the skin layer from a decorative side of the covering.

3. The method of claim 1, wherein the skin layer comprises leather.

4. The method of claim 1, wherein the skin layer comprises a polymeric material.

5. The method of claim 1, wherein the compound chamfer includes a chamfer surface that forms an angle of 10 degrees or less with a longitudinal axis of the piercing tool.

6. The method of claim 1, wherein the compound chamfer includes a pair of chamfer surfaces that are symmetric with respect to a longitudinal axis of the piercing tool.

7. The method of claim 6, wherein the chamfer surfaces of the pair intersect along an edge of the piercing tool, said edge extending from a tip of the piercing tool to another chamfer surface.

8. The method of claim 1, wherein the piercing tool has an effective piercing diameter in a range from 0.1 mm to 0.75 mm.

9. The method of claim 8, wherein the effective piercing diameter is 0.4 mm or less.

10. The method of claim 1, wherein the piercing tool includes a generally cylindrical shank that passes at least partly through the skin layer during step (c) and the formed microholes have an aspect ratio of 2.0 or higher.

11. The method of claim 1, wherein the piercing tool is configured to form microholes that are laterally offset from the center of a cylindrical shank of the piercing tool.

12. The method of claim 1, wherein step (b) is performed before step (c).

* * * * *